UNITED STATES PATENT OFFICE.

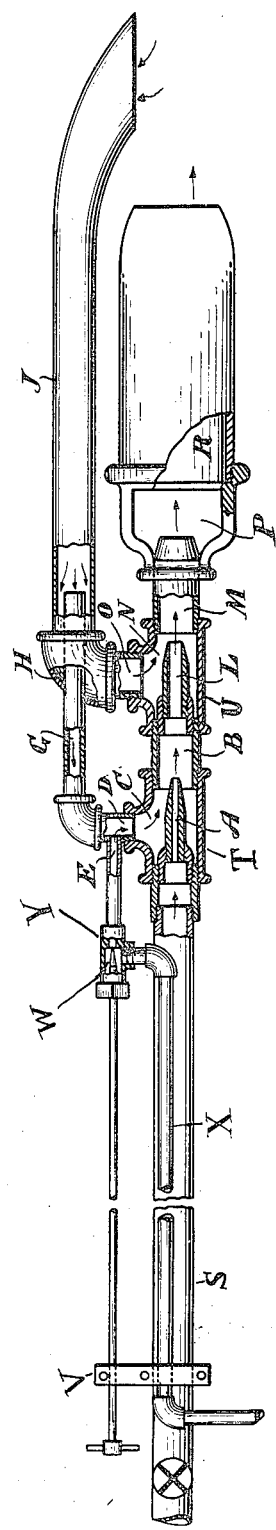

MANUEL ROCHA PAVON, OF OAKLAND, CALIFORNIA.

COAL-OIL TORCH.

1,297,588.

Specification of Letters Patent. Patented Mar. 18, 1919.

Application filed July 11, 1918. Serial No. 244,390.

*To all whom it may concern:*

Be it known that I, MANUEL ROCHA PAVON, a citizen of the United States, residing at Oakland, in the county of Alameda and State of California, the undersigned, have invented certain new and useful Improvements in Coal-Oil Torches, of which the following is a specification.

My invention relates to improvements in coal oil torches. Although my improved torch is particularly intended as a coal oil torch, as coal oil produces the hottest flame, any of the other light fuel oils in use or even crude oil may be used therein with very good results. The said torch has among its advantages, which were the objects of the invention, the production of an intensely hot flame, whereby much time and labor is saved, its portability owing to its particular construction, economy in its operation, the oil consumed producing the maximum amount of heat units due to the process of atomizing, gasifying and superheating accomplished by its use, resulting in a highly combustible gas for the operation of the device.

In the accompanying drawing the figure represents an elevation of my coal oil torch, parts thereof being shown in section to disclose the interior.

In the said drawing S represents a pipe having a valve as shown, the view of said pipe being broken for the purposes of said drawing. The front end of said pipe supports a coupling which holds in its front end the hollow body of a jet A. Penetrated by the front end of said jet is a sleeve B which holds in its front end a larger jet L. A casing T having an opening in its upper side connects said coupling to said sleeve. A casing U having also an opening in its upper side contains said jet L, and the greater part of its hollow body as shown. In the front end of said casing U is contained an enlarged nipple M projecting forwardly, and to said nipple is connected a bell-shaped reducer carrying the head R constituting a combustion chamber with a mouth as shown. In the upper opening of casing T is the T D connected by a coupling to a pipe G running at right angles thereto. In the upper opening of casing U is contained a joint O connected by a coupling H to a pipe J having a flaring mouth as shown. The coupling H is perforated therethrough and the pipe G extends therein and into pipe J. A bracket V holds pipe S, also pipe X and the stem of the needle W which is contained and works in valve-chamber Y; the hollow stem E of the T D is connected to the said valve-chamber Y; the valve-chamber Y has a lower opening in which is contained one end of a joint connected by a coupling to pipe X.

In the operation compressed air or steam enters the sleeve B from pipe S through jet A, forming a partial vacuum in chamber C of housing T in connection with said joint. A hot non-combustible gas is supplied and drawn directly from a flame through the pipe J, and thus into pipe G, whose diameter is less than the diameter of the interior of pipe J, leaving a space around the part of pipe G in said pipe J. From the pipe G such gas is drawn into T D where it is further heated and is well mixed with vaporized coal oil supplied and entering through pipe X, valve-casing Y and stem E. The consequent gaseous mixture is thereupon blown downwardly and through sleeve B and jet L, and another partial vaccum is formed in chamber N of casing U and which draws a further supply of hot non-combustible gas through pipe J into coupling H, joint O, chamber N and nipple M, superheating the gaseous mixture and resulting in an extremely hot gas. This hot gas is blown through nipple M into reducer P, where it mixes with air entering through suitable air ports forwardly, the combustion taking place in head R. While compressed air or steam is entering from pipe S through the arrangement of the pipe G entering through coupling H into pipe J, the partial gasification of the oil entering through stem E and T D, mixing with the heated air entering from pipe J is accomplished, and when the mixture passes from jet L into casing U, further heated air entering through pipe J, coupling H and joint O completes the gasification of the mixture so that pure gas is supplied through nipple M into head R.

I claim:

1. In a torch a housing having end openings and having an extension forming a joint connected to said housing at the front opening of said end openings, a jet positioned in said housing and pointing to said extension, a casing having end openings and having the rear opening of said end openings connected to said joint, a jet positioned in said casing and pointing forwardly in proximity to the front opening of said casing, a reducer before the front opening of said casing, means connecting said reducer with the front opening of said casing, a head having a mouth in connection with said reducer, a pipe having a valve connected to the rear opening of said housing and a T having its stem pointing rearwardly connected to the side opening of said housing; a valve casing having end openings and a side opening, the front opening of the end openings of said valve casing being connected to said stem, and a valve in said valve casing.

2. In a torch a housing having a side opening and having end openings and having an extension forming a joint connected to said housing at the front opening of said end openings, a jet positioned in said housing and pointing into said extension, a casing having a side opening and having end openings and having the rear opening of said end openings connected to said extension, a jet positioned in said casing and pointing forwardly in proximity to the front opening of said casing, a reducer before the front opening of said casing, means connecting said reducer with the front opening of said casing, a head having a mouth in connection with said reducer, a pipe having a valve connected to the rear opening of said housing, a T having its stem pointing rearwardly connected to the side opening of said housing, a valve casing having end openings and a side opening, the front opening of the end openings of said valve casing being connected to said stem, a needle valve in said valve casing, a pipe connected to the side opening of said valve casing, and a pipe coupled to said T.

3. In a torch a housing having a side opening and having end openings and having an extension connected to said housing at the front opening of said end openings, a jet secured in said housing and pointing into said extension, a casing having a side opening and having end openings and having the rear opening of said end openings connected to said extension, a jet secured in said casing and pointing forwardly in proximity to the front opening of said casing, a nipple connected to the front opening of said casing, a reducer connected to said nipple, a head having a mouth connected to said reducer, a pipe having a valve connected to the rear opening of said housing, a T, having a stem pointing rearwardly, connected to the side opening of said housing, a valve casing having end openings and a side opening, the front opening of the end openings of said valve casing being connected to said stem, a valve in the said valve casing, a pipe connected to the side opening of said valve casing, a pipe coupled to the side opening of said casing, and a pipe coupled to said T and extended forwardly into the pipe coupled to the side opening of said casing.

4. In a torch a housing having a side opening and having end openings and having an extension connected to said housing at the front opening of said end openings, a jet secured in said housing and pointing into said extension, a casing having a side opening and having end openings and having the rear opening of said end openings connected to said extension, a jet secured in said casing and pointing forwardly in proximity to the front opening of said casing, a nipple connected to the front opening of said casing, a reducer connected to said nipple, a head having a mouth connected to said reducer, a pipe having a valve connected to the rear opening of said housing, a T, having a stem pointing rearwardly, connected to the side opening of said housing, a valve casing having end openings and a side opening, the front opening of the end openings of said valve casing being connected to said stem, a valve in the said valve casing, a pipe connected to the side opening of said valve casing, a pipe coupled to the side opening of said casing, and a pipe coupled to said T and extending forwardly into the pipe coupled to the side opening of said casing, said pipe coupled to said T having its diameter smaller than the diameter of the interior of said pipe coupled to the side opening of said casing.

In testimony whereof I affix my signature, in presence of two witnesses.

MANUEL ROCHA PAVON.

Witnesses:
C. J. FOARD,
R. BARKER.